(12) United States Patent
Sakai et al.

(10) Patent No.: US 7,284,798 B2
(45) Date of Patent: Oct. 23, 2007

(54) VEHICLE-SEAT RECLINING DEVICE AND PRODUCTION METHOD THEREFOR

(75) Inventors: Makoto Sakai, Kariya (JP); Yukifumi Yamada, Toyota (JP); Sadao Ito, Anjo (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 11/110,912

(22) Filed: Apr. 21, 2005

(65) Prior Publication Data

US 2005/0248196 A1 Nov. 10, 2005

(30) Foreign Application Priority Data

Apr. 26, 2004 (JP) .............................. 2004-130362

(51) Int. Cl.
*B60N 2/02* (2006.01)
(52) U.S. Cl. ..................................... 297/362
(58) Field of Classification Search ............. 297/361.1, 297/362
See application file for complete search history.

(56) References Cited

U.S. PATENT DOCUMENTS

| | | | |
|---|---|---|---|
| 5,531,504 A | 7/1996 | Schmale et al. | |
| 6,010,191 A | 1/2000 | Calinaud et al. | |
| 6,168,235 B1 | 1/2001 | Freund | |
| 6,390,556 B1 * | 5/2002 | Moradell | 297/362 |
| 6,619,743 B1 * | 9/2003 | Scholz et al. | 297/362 |
| 6,692,397 B2 * | 2/2004 | Wang et al. | 475/162 |
| 6,918,635 B2 * | 7/2005 | Finner et al. | 297/362 |
| 2005/0110322 A1 * | 5/2005 | Cha | 297/362 |

FOREIGN PATENT DOCUMENTS

| | | |
|---|---|---|
| DE | 31 30 315 A1 | 2/1983 |
| DE | 3130315 * | 2/1983 |
| DE | 41 15 204 A1 | 11/1992 |

* cited by examiner

*Primary Examiner*—Milton Nelson, Jr.
(74) *Attorney, Agent, or Firm*—Buchanan Ingersoll & Rooney PC

(57) ABSTRACT

A vehicle-seat reclining device includes a seat cushion frame, a seat back frame, a first base plate, a second base plate, and an internal gear recessed in one surface of the second base plate. A fitting projection having an outline that is concentric and in phase with that of the internal gear projects from the other surface of the second base plate, and a fitting hole is provided in the seat back frame so as to be fitted on the fitting projection.

19 Claims, 7 Drawing Sheets

FIG. 1A
FIG. 1B
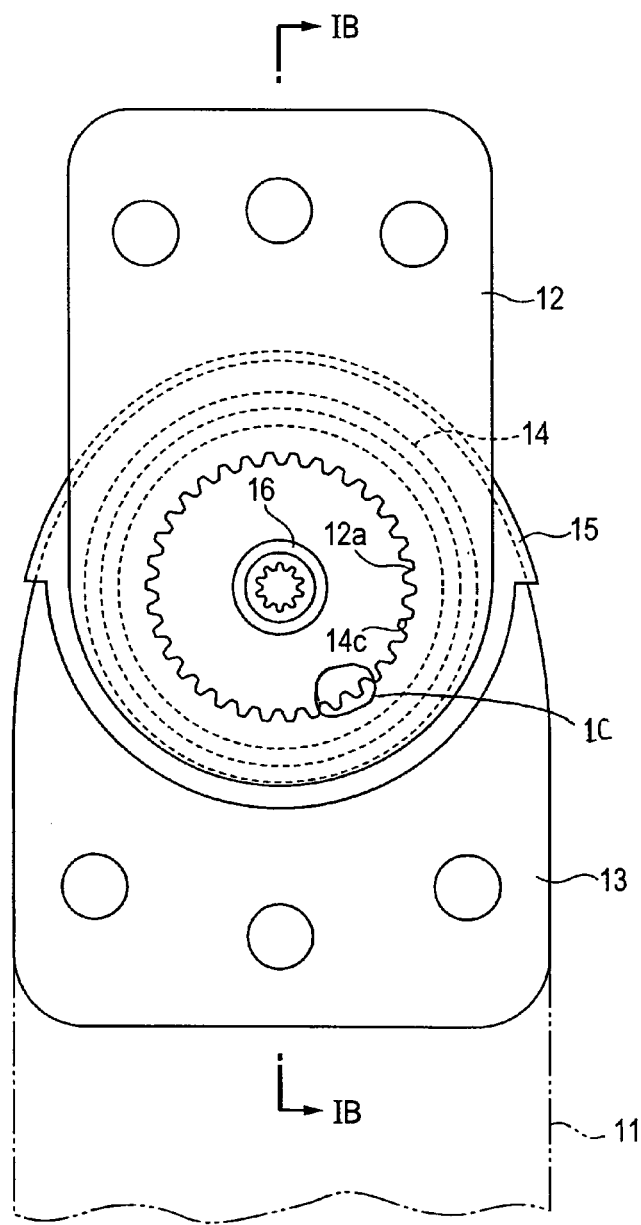
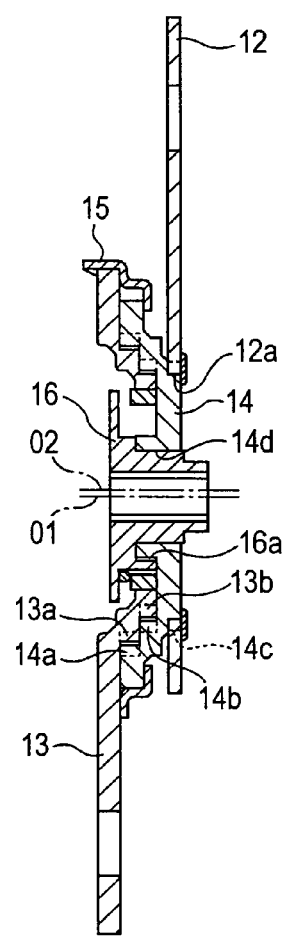

FIG. 4A
FIG. 4B
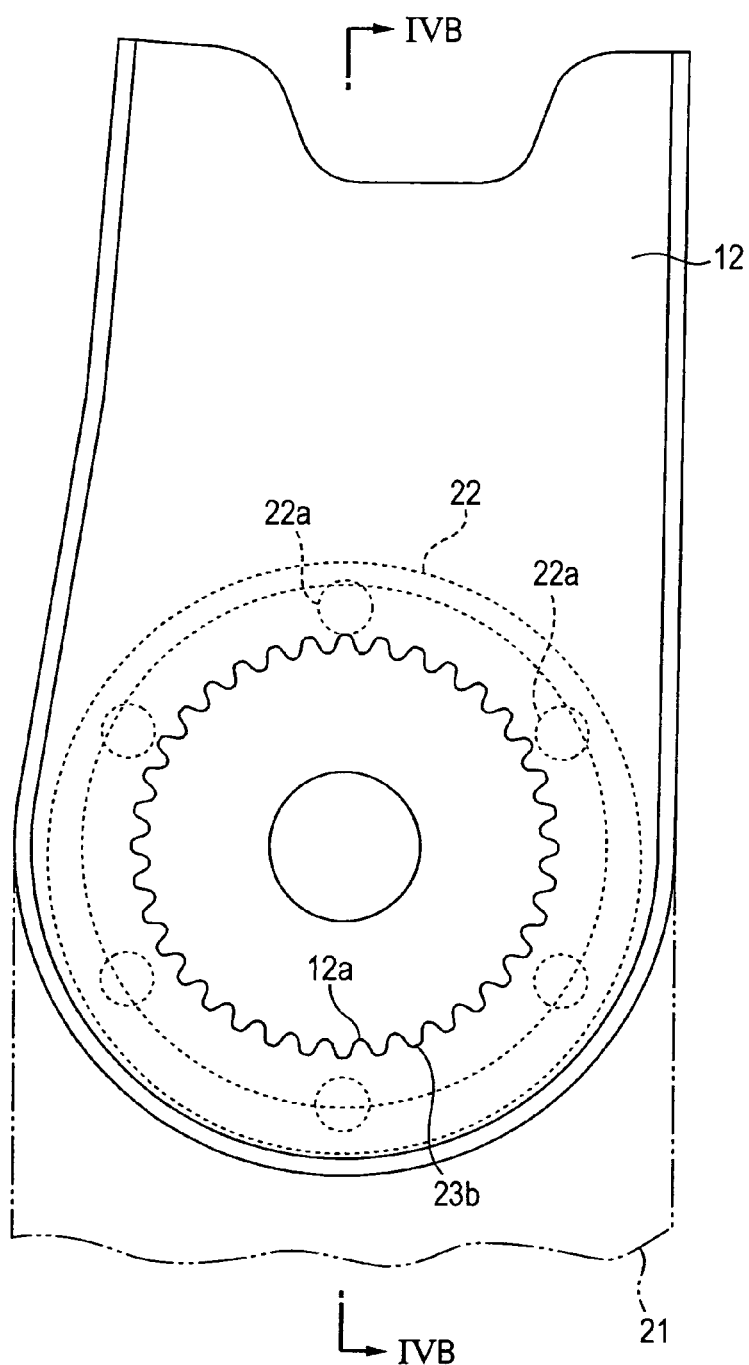
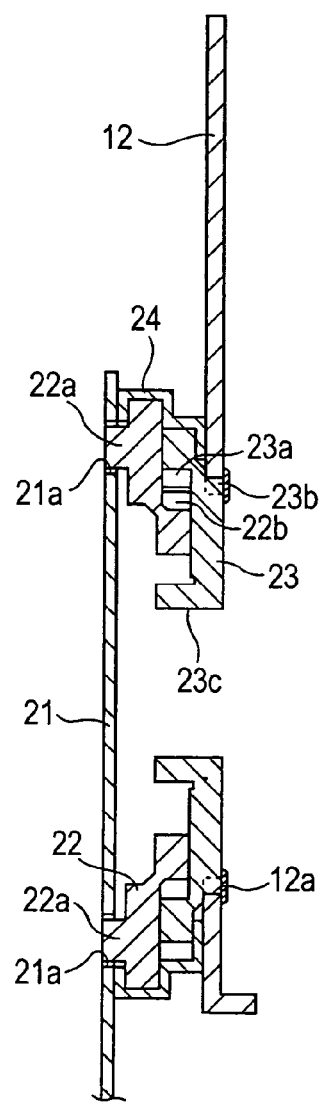

VEHICLE-SEAT RECLINING DEVICE AND PRODUCTION METHOD THEREFOR

The present invention is based on and claims priority under 35 U.S.C §119 with respect to Japanese Patent Application No. 2004-130362 filed on Apr. 26, 2004, the entire content of which is incorporated herein by reference.

BACKGROUND OF THE INVENTION

1. Field of the Invention

The present invention relates to a vehicle-seat reclining device, and a production method therefor.

2. Description of the Related Art

U.S. Pat. No. 6,010,191 discloses a vehicle-seat reclining device. The vehicle-seat reclining device includes a seat cushion frame, a seat back frame, and a lock mechanism provided between the seat cushion frame and the seat back frame. The lock mechanism includes a lower housing fixed to the seat cushion frame, an upper housing fixed to the seat back frame, and functional components that switch between states in which the rotation of the upper housing relative to the lower housing is prevented and allowed. Therefore, the lock mechanism also switches between states in which the pivotal movement of the seat back frame relative to the seat cushion frame is prevented and allowed.

The seat cushion frame and the lock mechanism (lower housing) are fixedly connected by fitting a plurality of fitting projections of the lower housing in a plurality of corresponding fitting holes of the seat cushion frame, and by welding fitting portions therebetween. Such a connection manner using a fitting technique is adopted to ensure a sufficient connecting strength.

In the vehicle-seat reclining device disclosed in the above publication, since a plurality of fitting projections project from the lower housing, it is necessary to provide space for the fitting projections. Moreover, in order to ensure the connecting strength, it is necessary to place the fitting projections, which are fitted in and welded to the fitting holes, at a distance in accordance with the required strength from the center of rotation of the lower housing. This increases the diameter of the lower housing, and also increases the total size of the reclining device.

U.S. Pat. No. 6,390,556 discloses another vehicle-seat reclining device that ensures the strength of connection by using a fitting technique. In this vehicle-seat reclining device, a seat back frame and a lock mechanism are connected by fitting a gear-shaped fitting portion, which is provided on the outer periphery of a disc-shaped side plate in the center of the lock mechanism, in a corresponding fitting hole provided in the seat back frame, and by welding the fitting portion and the fitting hole. In this method, however, the fitting portion projects from the center of the lock mechanism only for connection, and at least a space for the fitting portion is needed.

SUMMARY OF THE INVENTION

Accordingly, it is an object of the present invention to provide a vehicle-seat reclining device that ensures a required connecting strength and a reduced size, and a production method for the vehicle-seat reclining device.

In order to overcome the above problems, according to an aspect, the present invention provides a vehicle-seat reclining device including a seat cushion frame, a first base plate fixed to the seat cushion frame, a seat back frame, a second base plate fixed to the seat back frame, an internal gear recessed in one surface of one of the first base plate and the second base plate, an engaging unit engaged with the internal gear to rotatably connect the first base plate and the second base plate, a fitting projection projecting from the other surface of the one of the first base plate and the second base plate, and having an outline that is concentric and in phase with that of the internal gear, and a fitting hole provided in one of the seat cushion frame and the seat back frame fixed to the one of the first base plate and the second base plate, and fitted on the fitting projection.

In this case, correspondingly to the internal gear recessed in one surface of one of the first base plate and the second base plate, the fitting projection having an outline that is concentric and in phase with that of the internal gear projects from the other surface of the base plate with the internal gear. By fitting the fitting projection in the fitting hole provided in one of the seat cushion frame and the seat back frame to be fixed to the base plate, the base plate and the frame are connected. Since the fitting projection having notches (teeth) over the entire outer peripheral surface is thus fitted in the fitting hole, the base plate and the frame can be tightly connected so as not to rotate relative to each other.

The fitting projection is disposed at the center of rotation of the base plate correspondingly to the internal gear. Therefore, the diameter of the base plate can be decreased without reducing the strength, compared with a case in which a plurality of fitting portions are provided on the outer periphery of the base plate, as in the related art.

The fitting projection projects from the other surface of the base plate correspondingly to the recessed internal gear with which the engaging unit engages. This can reduce the space necessary for fitting.

Preferably, a space is provided between the fitting projection and the fitting hole.

In this case, for example, when the base plate having the fitting projection (first or second base plate) and the frame having the fitting hole (seat cushion frame or seat back frame) are fixed at a fitting portions by welding, molten globules enter the space. Therefore, the base plate and the frame can be connected more tightly.

Preferably, the internal gear and the fitting projection are formed by half blanking.

In this case, the internal gear and the fitting projection are simultaneously formed by pushing in one surface of the base plate and pushing out the other surface by half blanking. Therefore, the internal gear and the fitting projection can be formed quite easily.

Preferably, the engaging unit includes an external gear provided on the other of the first base plate and the second base plate, and having less teeth than that of the internal gear, a wedge member for holding a meshed portion between the internal gear and the external gear, and a rotation shaft rotatably supported by the first base plate or the second base plate to move the meshed portion between the internal gear and the external gear by pushing the wedge member.

According to another aspect, the present invention provides a production method for a vehicle-seat reclining device that includes a seat cushion frame, a first base plate fixed to the seat cushion frame, a seat back frame, a second base plate fixed to the seat back frame, an internal gear recessed in one surface of one of the first base plate and the second base plate, and an engaging unit engaged with the internal gear to rotatably connect the first base plate and the second base plate. The production method includes the steps of performing half blanking to form the internal gear and to form a fitting projection on the other surface of the one of the first base plate and the second base plate, the fitting projection having an outline that is concentric and in phase with an outline of the internal gear, and forming a fitting hole in one of the seat cushion frame and the seat back frame fixed to the one of the first base plate and the second base plate, the fitting hole being fitted on the fitting projection.

In this case, the internal gear and the fitting projection are simultaneously formed by pushing in one surface of the base plate and pushing out the other surface by half blanking. Therefore, the internal gear and the fitting projection can be formed quite easily. By fitting the fitting projection in the fitting hole provided in one of the seat cushion frame and the seat back frame, the base plate and the frame are fixed. Since the fitting projection having notches (teeth) over the entire outer peripheral surface is thus fitted in the fitting hole, the base plate and the frame can be tightly connected so as not to rotate relative to each other.

The fitting projection is disposed at the center of rotation of the base plate correspondingly to the internal gear. Therefore, the diameter of the base plate can be decreased without reducing the strength, compared with a case in which a plurality of fitting portions are provided on the outer periphery of the base plate, as in the related art.

The fitting projection projects from the other surface of the base plate correspondingly to the recessed internal gear with which the engaging unit engages. This can reduce the space necessary for fitting.

BRIEF DESCRIPTION OF THE DRAWINGS

FIGS. 1A and 1B are a side view and a cross-sectional view, respectively, showing a first embodiment of the present invention;

FIGS. 4A and 4B are a side view and a cross-sectional view, respectively, showing a second embodiment of the present invention;

DESCRIPTION OF THE PREFERRED EMBODIMENTS

Figure 1C:
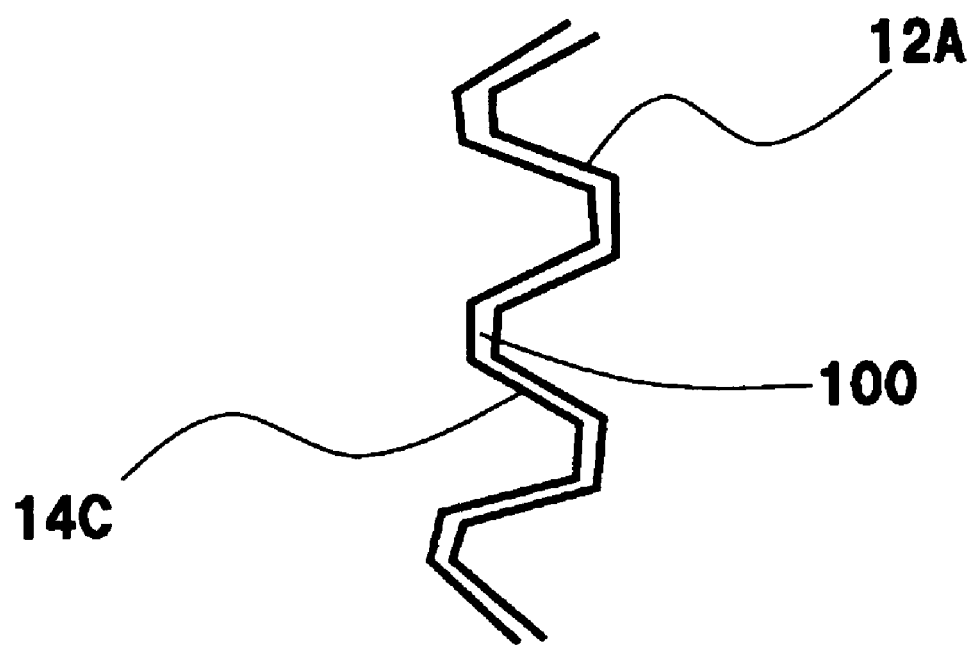
FIG. 1C is an enlarged side view of the circled portion of FIG. 1A labeled as 1C.

A first embodiment of the present invention will be described below with reference to the attached drawings.

FIG. 1A is a side view of a frame section of a vehicle-seat reclining device according to a first embodiment that is mounted in a vehicle, such as a car, as viewed from the inner side of a vehicle seat in the width direction, and FIG. 1B is a cross-sectional view taken along line IB—IB in FIG. 1A. FIG. 2 is a side view of the frame section, as viewed from the outer side of the vehicle seat in the width direction. This frame section shown in FIGS. 1A, 1B, and 2 is basically provided on each side of the vehicle seat in the width direction.

Referring to these figures, the vehicle-seat reclining device includes a seat cushion frame 11, a seat back frame 12, a first base plate 13, a second base plate 14, a holder 15, a rotation shaft 16, a pair of wedge members 17, and a spring 18 that constitute an engaging unit. The seat cushion frame 11 is a main component of a seat cushion, and the seat back frame 12 is a main component of a seat back.

The first base plate 13 is fixed to the seat cushion frame 11, for example, by fastening, and the second base plate 14 is fixed to the seat back frame 12 in a manner that will be described below. The seat back frame 12 is pivotally connected to the seat cushion frame 11 via the first and second base plates 13 and 14.

More specifically, the first base plate 13 is shaped like a plate having a center opening by half blanking. A surface of the first base plate 13 opposing the second base plate 14 is provided with a first external gear 13a and a second external gear 13b projecting toward the second base plate 14 to constitute the engaging unit. Outlines of the first and second external gears 13a and 13b are concentric and in phase with each other. The diameter of the second external gear 13b is smaller than that of the first external gear 13a.

The second base plate 14 is shaped like a ring having a center bearing hole 14d by half blanking. A surface of the second base plate 14 opposing the first base plate 13 is provided with a first internal gear 14a and a second internal gear 14b recessed away from the first base plate 13. Outlines of the first and second internal gears 14a and 14b are concentric and in phase with each other, and the diameter of the second internal gear 14b is smaller than that of the first internal gear 14a.

The diameter of the first internal gear 14a is larger than that of the first external gear 13a, and the diameter of the second internal gear 14b is larger than that of the second external gear 13b. The number of teeth of the first internal gear 14a is larger than that of the first external gear 13a by a predetermined number (one), and the number of teeth of the second internal gear 14b is larger than that of the second external gear 13b by a predetermined number (one). The first and second internal gears 14a and 14b have such outlines as to be meshed with the first and second external gears 13a and 13b, respectively. When the gears are meshed, the center axis 01 of the first and second internal gears 14a and 14b and the center axis 02 of the first and second external gears 13a and 13b are not aligned with each other. Therefore, every time the meshed portions between the first and second internal gears 14a and 14b and the first and second external gears 13a and 13b sequentially shift in the circumferential direction and make one turn, the second base plate 14 rotates relative to the first base plate 13 by an angle corresponding to the difference in the number of teeth.

Figure 3:
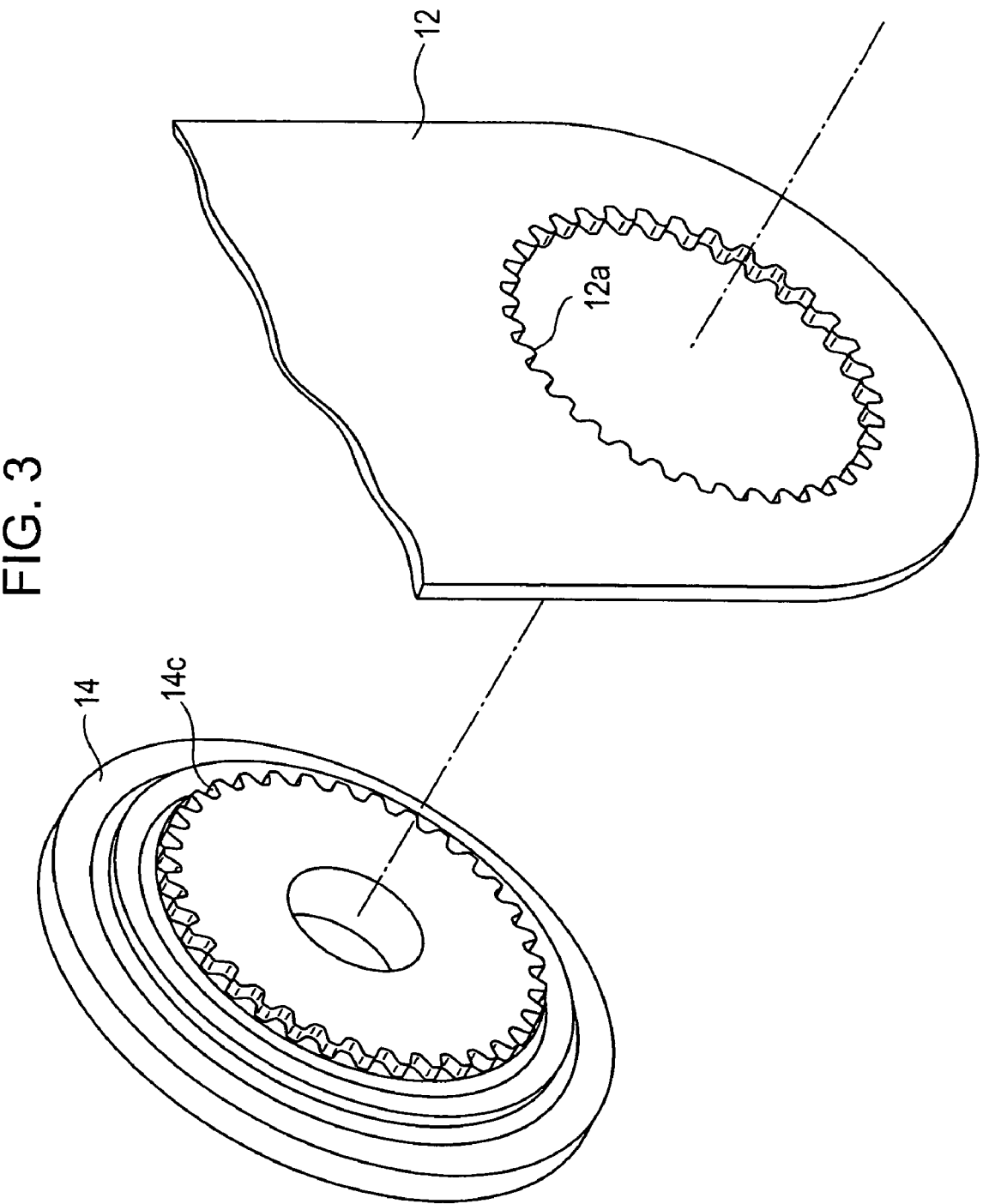
FIG. 3 is an exploded perspective view showing the first embodiment.

As is also shown in FIG. 3 as an exploded perspective view, a surface of the second base plate 14 opposite the surface having the first and second internal gears 14a and 14b projects because of half blanking, and has a fitting projection 14c provided correspondingly to the second internal gear 14b. The fitting projection 14c has an outline that is concentric and in phase with that of the second internal gear 14b. Valleys (concave portions) and peaks (convex portions) provided on the outer peripheral surface of the fitting projection 14c correspond, respectively, to peaks and valleys of the second internal gear 14b. That is, the fitting projection 14c is provided as a so-called serration shaft that alternately projects and is recessed over the entire outer peripheral surface.

The seat back frame 12 has a fitting hole 12a corresponding to the fitting projection 14c. The fitting hole 12a is opened in the shape of an internal gear so as to be fitted on the fitting projection 14c with a space therebetween. The second base plate 14 is fixed to the seat back frame 12 by fitting the fitting projection 14c in the fitting hole 12a and by welding a circular fitting portion therebetween. Therefore, the second base plate 14 is substantially combined with the seat back frame 12.

The holder 15 is ring-shaped, and is mounted on outer surfaces of the first base plate 13 and the second base plate 14 that are engaged in a noncoaxial manner. The first base plate 13 and the second base plate 14 are prevented by the holder 15 from falling off in the axial direction while the meshed portions between the first and second internal gears 14a and 14b and the first and second external gears 13a and 13b are allowed to move.

The rotation shaft 16 is drivingly connected to a driver (not shown), is rotatably supported in the bearing hole 14d of the second base plate 14, and has an arc-shaped pressing projection 16a projecting parallel to the axial direction. The wedge members 17 are provided between the rotation shaft 16 and the first base plate 13 so as to oppose both end portions of the pressing projection 16a in the circumferential direction. The wedge members 17 hold the meshed portions between the first and second external gears 13a and 13b and the first and second internal gears 14a and 14b in a radial direction opposite a radial direction passing through the circumferential center of the pressing projection 16a. The holding state is supported by the spring 18.

When the rotation shaft 16 is rotated, one of the wedge members 17 in accordance with the direction of rotation is pressed by the pressing projection 16a, and both the wedge members 17 turn together. Consequently, the meshed portions between the first and second internal gears 14a and 14b and the first and second external gears 13a and 13b sequentially shift, and the second base plate 14 rotates relative to the first base plate 13 in the above-described manner. As a result, the seat back frame 12 combined with the second base plate 14 pivots relative to the seat cushion frame 11.

The first embodiment described in detail above provides the following advantages.

(1) Correspondingly to the second internal gear 14b provided on one surface of the second base plate 14, the fitting projection 14c having an outline, which is concentric and in phase with that of the second internal gear 14b, projects from the other surface. By fitting the fitting projection 14c in the fitting hole 12a of the seat back frame 12, the second base plate 14 is connected to the seat back frame 12. Since the fitting projection 14c having notches (teeth) over the entire outer peripheral surface is fitted in the fitting hole 12a, the second base plate 14 and the seat back frame 12 can be tightly connected so as not to turn relative to each other.

Since the fitting projection 14c is provided on the rotation center side of the second base plate 14 correspondingly to the second internal gear 14b, the second base plate 14 can be prevented from being increased in diameter without reducing the strength, for example, compared with the related art (Japanese Unexamined Patent Application Publication No. 10-276850) in which a plurality of fitting portions are provided on the outer periphery of the base plate.

The fitting projection 14c projects from the other surface of the second base plate 14 correspondingly to the recess of the second internal gear 14b which is engaged with the second external gear 13b. Therefore, it is possible to reduce an additional space necessary for the fitting.

Figure 2:
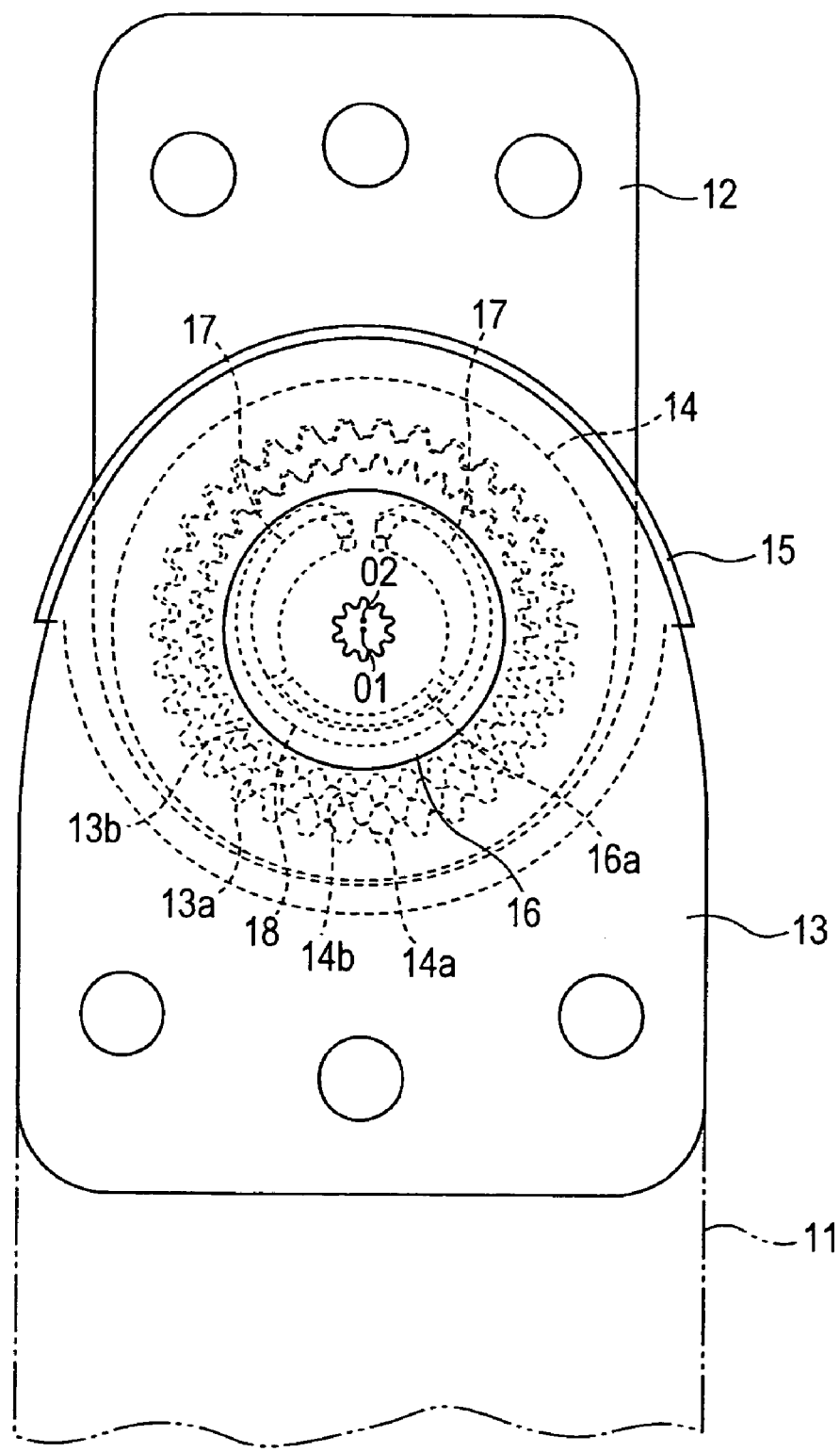
FIG. 2 is a side view showing the first embodiment.

(2) As seen in FIG. 1C, a space 100 is provided between the fitting projection 14c and the fitting hole 12a. When the second base plate 14 and the seat back frame 12 are fixed by welding at the fitting portion therebetween, molten globules enter the space. This can more tightly join the second base plate 14 and the seat back frame 12.

In addition, the welding operation is performed only at the fitting portion.

(3) The second internal gear 14b and the fitting projection 14c are simultaneously formed by pushing in one surface of the second base plate 14 and pushing out the other surface by half blanking. Therefore, the second internal gear 14b and the fitting projection 14c can be formed easily.

(4) The first base plate 13 and the second base plate 14 are tightly connected at two meshed portions between the first and second external gears 13a and 13b and the first and second internal gears 14a and 14b.

Second Embodiment

A second embodiment of the present invention will be described with reference to FIGS. 4A and 4B. The second embodiment is different from the first embodiment in that first and second base plates are connected at one meshed portion between an external gear and an internal gear. Therefore, descriptions of similar components are omitted.

FIG. 4A is a side view of a frame section of a vehicle-seat reclining device according to the second embodiment of the present invention, as viewed from the inner side of a vehicle seat in the width direction, and FIG. 4B is a cross-sectional view taken along line IVB—IVB in FIG. 4A. As shown in FIGS. 4A and 4B, the vehicle-seat reclining device includes a seat cushion frame 21, a first base plate 22, a second base plate 23, a holder 24, and a seat back frame 12.

The seat cushion frame 21 has a plurality of (six) fitting holes 21a arranged at predetermined angular intervals. The first base plate 22 is shaped like a ring having a center opening by half blanking, and has a plurality of (six) fitting projections 22a to be fitted in the fitting holes 21a. The first base plate 22 is fixed to the seat cushion frame 21 by fitting the fitting projections 22a in the fitting holes 21a and welding fitting portions therebetween.

A surface of the first base plate 22 opposing the second base plate 23 is provided with an external gear 22b projecting toward the second base plate 23 to constitute an engaging unit.

The second base plate 23 is also formed by half blanking, and is shaped like a ring having a center bearing hole 23c. A surface of the second base plate 23 opposing the first base plate 22 is provided with an internal gear 23a recessed away from the first base plate 22.

The internal gear 23a has a diameter larger than that of the external gear 22b, and has more teeth than those of the external gear 22b by a predetermined number, in a manner similar to that in the first embodiment. Therefore, every time a meshed portion between the internal gear 23a and the external gear 22b sequentially shifts in the circumferential direction and makes one turn, the second base plate 23 rotates relative to the first base plate 22 by an angle corresponding to the difference in the number of teeth. The meshed portion between the internal gear 23a and the external gear 22b is shifted by the action of the engaging unit (for example, a rotation shaft and wedge members) provided, as in the first embodiment.

A surface of the second base plate 23 opposite the surface having the internal gear 23a has a fitting projection 23b formed by half blanking so as to project outward. The fitting projection 23b has an outline that is concentric and in phase with that of the internal gear 23a. In a manner similar to that in the first embodiment, the fitting projection 23b is provided as a so-called serration shaft that alternately projects and is recessed over the entire outer peripheral surface. The second base plate 23 is fixed to the seat back frame 12 by fitting the fitting projection 23b in a fitting hole 12a and by welding a circular fitting portion therebetween.

The holder 24 is ring-shaped, and is mounted on outer peripheral faces of the first base plate 22 and the second base plate 23 that are engaged in a noncoaxial manner. The first base plate 22 and the second base plate 23 are prevented by the holder 24 from falling off in the axial direction while the meshed portion between the internal gear 23a and the external gear 22b is allowed to move. Both surfaces of the holder 24 in the axial direction are held between the seat cushion frame 21 and the seat back frame 12.

In the above-described configuration, the seat back frame 12 is pivotally connected to the seat cushion frame 21 via the first and second base plates 22 and 23.

The second embodiment described in detail above provides advantages similar to the advantages (1) to (3) of the first embodiment.

Third Embodiment

A third embodiment of the present invention will be described below with reference to FIG. 5. The third embodiment is different from the first embodiment in that internal gears are provided in a first base plate and external gears are provided on a second base plate. Therefore, descriptions of similar components are omitted.

Figure 5:
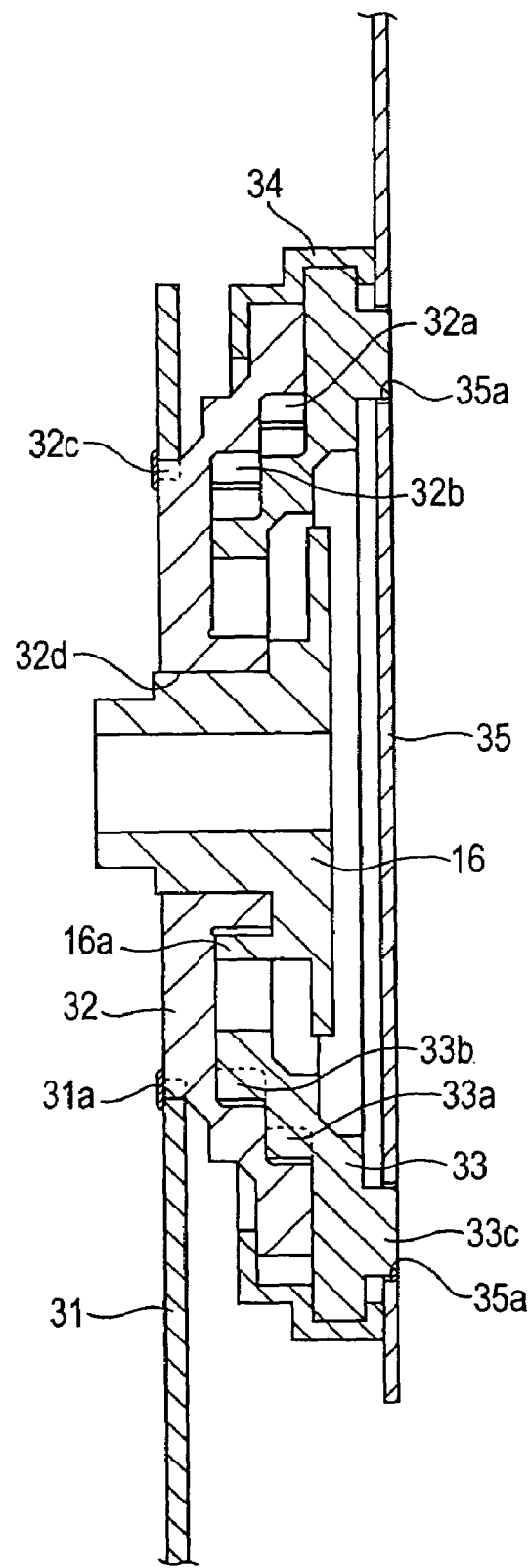
FIG. 5 is a cross-sectional view showing a third embodiment of the present invention.

FIG. 5 is a cross-sectional view of a frame section of a vehicle-seat reclining device according to a third embodiment of the present invention. As shown in FIG. 5, the vehicle-seat reclining device includes a seat cushion frame 31, a first base plate 32, a second base plate 33, a holder 34, and a seat back frame 35.

The seat cushion frame 31 has a fitting hole 31a that is open in the form of an internal gear. The first base plate 32 is formed by half blanking, and is shaped like a ring having a center bearing hole 32d. A surface of the first base plate 32 opposing the second base plate 33 is provided with a first internal gear 32a and a second internal gear 32b recessed away from the second base plate 33. The first and second internal gears 32a and 32b have concentric and in-phase outlines. The diameter of the second internal gear 32b is smaller than that of the first internal gear 32a.

A surface of the first base plate 32 opposite the surface having the first and second internal gears 32a and 32b has a fitting projection 32c formed by half blanking so as to project correspondingly to the second internal gear 32b. The fitting projection 32c has an outline that is concentric and in phase with that of the second internal gear 32b, and is provided as a so-called serration shaft that alternately projects and is recessed over the entire outer peripheral surface. The first base plate 32 is fixed to the seat cushion frame 31 by fitting the fitting projection 32c in the fitting hole 31a and by welding a circular fitting portion therebetween. Therefore, the first base plate 32 is substantially combined with the seat cushion frame 31.

The second base plate 33 is also formed by half blanking, and is shaped like a ring having a center opening. A surface of the second base plate 33 opposing the first base plate 32 is provided with a first external gear 33a and a second external gear 33b projecting toward the first base plate 32 to constitute the engaging unit. The first and second external gears 33a and 33b have concentric and in-phase outlines, and the diameter of the second external gear 33b is smaller than that of the first external gear 33a.

In a manner similar to that in the first embodiment, the diameters of the first and second internal gears 32a and 32b are larger than the diameters of the first and second external gears 33a and 33b, respectively. The number of teeth of the first internal gear 32a is larger than that of the first external gear 33a by a predetermined number, and the number of teeth of the second internal gear 32b is larger than that of the second external gear 33b by a predetermined number. Therefore, every time the meshed portions between the first and second internal gears 32a and 32b and the first and second external gears 33a and 33b sequentially shift in the circumferential direction and make one turn, the second base plate 33 rotates relative to the first base plate 32 by an angle corresponding to the difference in the number of the teeth. The meshed portions are shifted by the action of the engaging unit (for example, rotation shaft and wedge members) similar to those in the first embodiment.

The second base plate 33 has a plurality of fitting projections 33c projecting at predetermined angular intervals (only two of them are shown in FIG. 5). Correspondingly, the seat back frame 35 has a plurality of fitting holes 35a (only two of them are shown in FIG. 5) in which the fitting projections 33c are fitted. The second base plate 33 is fixed to the seat back frame 35 by fitting the fitting projections 33c in the fitting holes 35a and by welding fitting portions therebetween.

The holder 34 is ring-shaped, and is mounted on outer peripheral faces of the first base plate 32 and the second base plate 33 that are engaged in a noncoaxial manner. The first and second base plates 32 and 33 are prevented from falling off in the axial direction while the meshed positions between the first and second internal gears 32a and 32b and the first and second external gears 33a and 33b are allowed to move.

In the above-described configuration, the seat back frame 35 is pivotally connected to the seat cushion frame 31 via the first and second base plates 32 and 33.

The third embodiment described in detail above provides advantages similar to those of the first embodiment.

Fourth Embodiment

Figure 6:
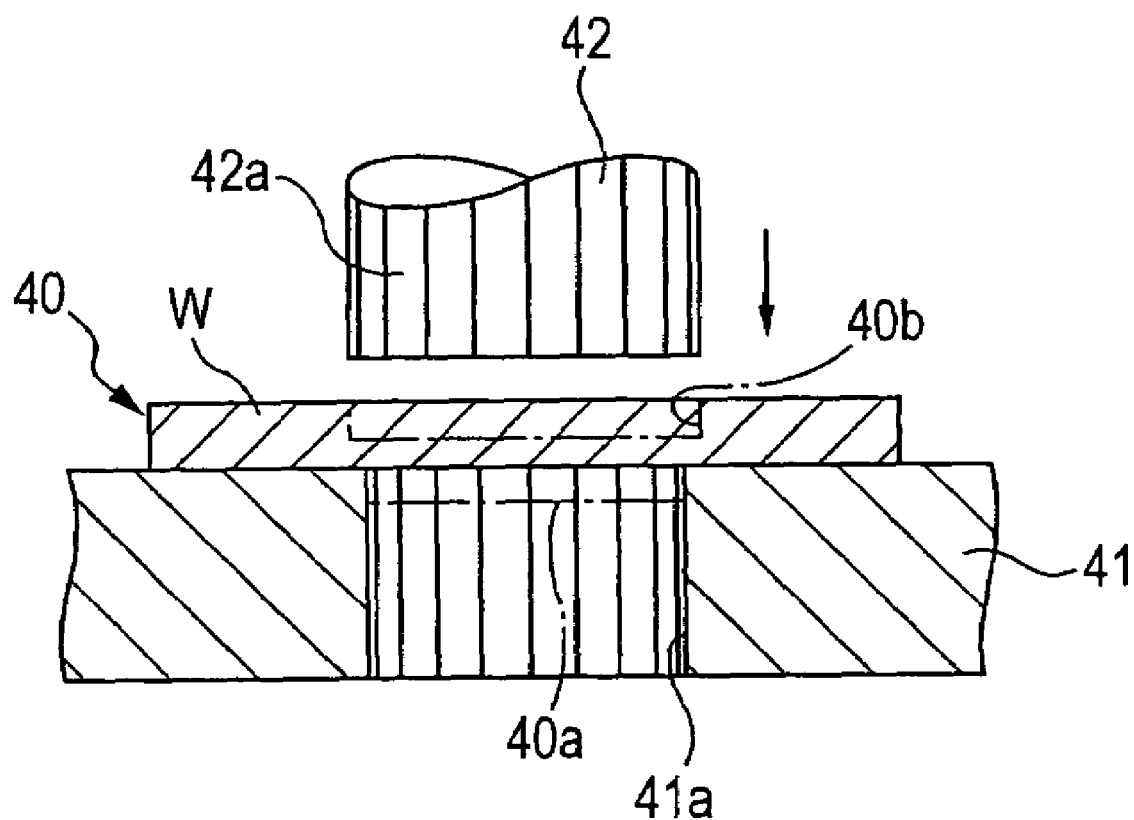
FIG. 6 is a schematic view showing a fourth embodiment of the present invention.

A fourth embodiment of the present invention will be described with reference to FIG. 6 as a schematic view. In the fourth embodiment, a more specific description will be given of a half blanking method for forming the base plates having internal gears (the first base plate 32 and the second base plates 14 and 23) in the above embodiments. In FIG. 6, the base plates are represented by a base plate 40, and a workpiece W is a material of the base plate 40.

As shown in FIG. 6, a workpiece W to be worked into the base plate 41 is placed on a die 41. The die 41 includes a notched groove 41a having notches on the entire inner peripheral surface correspondingly to a fitting projection 40a of a base plate 40.

A punch 42 is pressed against the workpiece W in such a manner as to be concentric with the notched groove 41a of the die 41. The outer diameter of the punch 42 is slightly larger than the inner diameter of the notched groove 41a. The punch 42 has a gear groove 42a with notches over the entire outer peripheral surface correspondingly to an internal gear 40b of the base plate 40.

Therefore, when the punch 42 is pressed against the workpiece W disposed on the die 41, it pushes the workpiece 42 into the die 40. Consequently, an internal gear 40b is formed in one surface of the base plate 40 correspondingly to the gear groove 42a of the punch 42, and a fitting projection 40a is formed on the other surface of the base plate 40 correspondingly to the notched groove 41a of the die 41. The fitting projection 40a is connected to a corresponding frame (seat cushion frame or seat back frame), thus providing advantages similar to those in the above embodiments.

In the fourth embodiment described in detail above, the internal gear 40*b* and the fitting projection 40*a* are simultaneously formed by pushing in one surface of the base plate 40 (workpiece W) and pushing out the other surface by half blanking. Therefore, the internal gear 40*b* and the fitting projection 40*a* can be formed quite easily.

The present invention is not limited to the above embodiments, and the following modifications are possible.

In the second embodiment, an internal gear may be provided in the first base plate 22, and an external gear may be provided on the second base plate 23. In this case, a fitting projection is provided on the first base plate 22 correspondingly to the internal gear, and a fitting hole, in which the fitting projection is fitted and which is shaped like an internal gear, is provided in the seat cushion frame 21.

In the above embodiments, three or more internal gears may be provided.

The engaging unit engaged with the internal gears has been described as an example in the above embodiments.

While the base plate and the frame are connected by fitting the fitting projection in the fitting hole in the above embodiments, they may be fixed, for example, by caulking.

What is claimed is:

1. A vehicle-seat reclining device comprising:
    a seat cushion frame;
    a first base plate fixed to the seat cushion frame;
    a seat back frame;
    a second base plate fixed to the seat back frame;
    an internal gear recessed in one surface of one of the first base plate and the second base plate;
    an engaging unit engaged with the internal gear to rotatably connect the first base plate and the second base plate;
    a fitting projection projecting from the other surface of said one of the first base plate and the second base plate, and having an outline that is concentric with an outline of the internal gear; and
    a fitting hole provided in one of the seat cushion frame and the seat back frame fixed to said one of the first base plate and the second base plate, and fitted on the fitting projection.

2. The vehicle-seat reclining device according to claim 1, wherein a space is provided between the fitting projection and the fitting hole.

3. The vehicle-seat reclining device according to claim 1, wherein the internal gear and the fitting projection are formed by half blanking.

4. The vehicle-seat reclining device according to claim 1, wherein the engaging unit comprises:
    an external gear provided on the other of the first base plate and the second base plate, and having less teeth than teeth of the internal gear;
    a wedge member for holding a meshed portion between the internal gear and the external gear; and
    a rotation shaft rotatably supported by said one of the first base plate and the second base plate to move the meshed portion between the internal gear and the external gear by pushing the wedge member.

5. The vehicle-seat reclining device according to claim 4, wherein the first base plate and the second base plate are tightly connected at a meshed portion between the internal gear and the external gear.

6. The vehicle-seat reclining device according to claim 4, wherein the internal gear and the external gear are provided at the first base plate and the second base plate, respectively.

7. The vehicle-seat reclining device according to claim 4, wherein the internal gear and the external gear are provided at the second base plate and the first base plate, respectively.

8. The vehicle-seat reclining device according to claim 1, wherein the engaging unit includes an outer gear which is engaged with the internal gear at a meshed portion.

9. The vehicle-seat reclining device according to claim 8 further comprising another internal gear and another external gear which are engaged with each other at a meshed portion.

10. The vehicle-seat reclining device according to claim 8, wherein the internal gear and the external gear are provided at the first base plate and the second base plate, respectively.

11. The vehicle-seat reclining device according to claim 8, wherein the internal gear and the external gear are provided at the second base plate and the first base plate, respectively.

12. A vehicle-seat reclining device comprising:
    a seat cushion frame;
    a first base plate fixed to the seat cushion frame;
    a seat back frame;
    a second base plate fixed to the seat back frame;
    an internal gear recessed in one surface of one of the first base plate and the second base plate;
    an external gear provided on the other one of the first base plate and the second base plate, the external gear engaging the internal gear to rotatably connect the first base plate and the second base plate;
    a fitting projection projecting from the other surface of said one of the first base plate and the second base plate; and
    a fitting hole provided in one of the seat cushion frame and the seat back frame fixed to said one of the first base plate and the second base plate, the fitting projection being positioned in the fitting hole;
    wherein an outer surface of the fitting projection is provided with external teeth and the fitting hole is provided with internal teeth, the external teeth of the fitting projection engaging the internal teeth of the fitting hole.

13. The vehicle-seat reclining device according to claim 12, wherein the internal gear includes peaks and valleys and the external gear includes peaks and valleys, the peaks of the internal gear corresponding to the valleys of the external gear and the valleys of the internal gear corresponding to the peaks of the external gear, the fitting projection possessing an outline that is concentric with an outline of the internal gear.

14. The vehicle-seat reclining device according to claim 12, further comprising a rotation shaft rotatably supported by said one of the first base plate and the second base plate.

15. The vehicle-seat reclining device according to claim 14, further comprising a wedge member positioned between the rotation shaft and said one of the first base plate and the second base plate.

16. The vehicle-seat reclining device according to claim 12, wherein the internal gear is provided at the first base plate and the external gear is provided at the second base plate.

17. The vehicle-seat reclining device according to claim 12, wherein the external gear is provided at the first base plate and the internal gear is provided at the second base plate.

18. The vehicle-seat reclining device according to claim 12, wherein the external gear possesses a lesser number of teeth than the internal gear.

19. The vehicle-seat reclining device according to claim 12, further comprising another internal gear and another external gear which are engaged with each other at a meshed portion.

* * * * *